United States Patent [19]
Wood

[11] 3,724,237
[45] Apr. 3, 1973

[54] ATTACHMENT COUPLING FOR POWER TOOL

[75] Inventor: John W. Wood, Baltimore, Md.

[73] Assignee: The Black and Decker Manufacturing Company, Towson, Md.

[22] Filed: June 7, 1971

[21] Appl. No.: 150,344

[52] U.S. Cl..................64/4, 287/103 A, 173/29, 408/20
[51] Int. Cl................F16c 1/06, F16c 1/12
[58] Field of Search...287/110, 103 A; 408/234, 241, 408/20; 173/29, 163; 64/4

[56] References Cited

UNITED STATES PATENTS

| | | | |
|---|---|---|---|
| 2,541,526 | 2/1957 | Lundquist | 287/103 A |
| 1,699,870 | 1/1929 | Black et al. | 408/241 X |
| 3,009,493 | 11/1961 | Dodegge | 144/1 R |
| 3,056,439 | 10/1962 | Hall et al. | 144/1 C |

*Primary Examiner*—Francis S. Husar
*Attorney*—Leonard Bloom et al.

[57] ABSTRACT

An improved attachment coupling means for use in attaching a variety of tool heads to a common power unit is provided in which a spring biasing means is utilized to draw the head and the power unit together when the coupling is made. In addition, flat surfaces are provided at the abutment point so that the spring biasing maintains the head in proper alignment with the drive unit. Axial and radial piloting surfaces are provided for both the stationary and rotary parts of the attachment.

17 Claims, 6 Drawing Figures

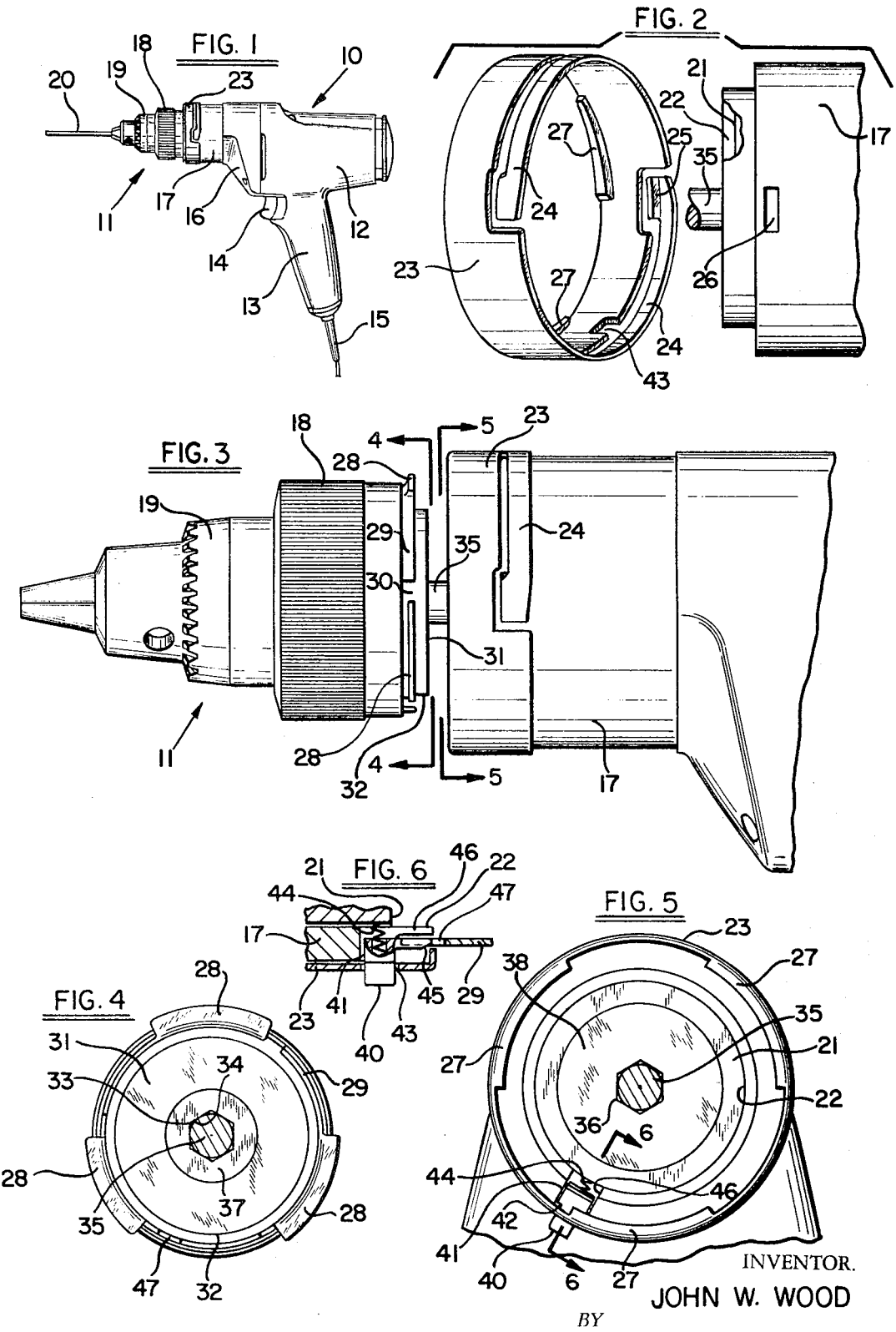

ATTACHMENT COUPLING FOR POWER TOOL

The present invention is directed to a power driver adapted for use with a variety of heads and specifically relates to an improved means for attaching a variety of tool heads to the driver unit.

Power tools which include common driving units with a variety of detachable and interchangeable heads present the need for a quickly and easily operated attachment coupling. However, in order to assure accuracy in the positioning of the functional parts of the detachable members, it is necessary that the attachment coupling provide a very precise and very stable alignment between the detachable head and the power unit. It is the purpose of the present invention to provide an improved attachment coupling means which meets these requirements.

Accordingly, it is an object of the present invention to provide a new and improved attachment coupling arrangement for detachable power tool units.

Another object of this invention is the provision of an improved attachment coupling means which provides and maintains a precise, stable alignment of a detachable head.

A further object of this invention is the provision of a simple, inexpensive attachment means for a power tool drive unit.

It is also an object of this invention to provide a simple, easily operated attachment coupling means for a power tool drive unit.

Further objects and advantages of this invention will become apparent as the description and illustration thereof proceed.

Briefly, in accord with one embodiment of this invention, an improved attachment coupling means for use in attaching a variety of tool heads to a common power unit is provided in which a spring biasing means is utilized to draw the head and the power unit together when the coupling is made. In addition, flat surfaces are provided at the abutment point so that the spring biasing maintains the head in proper alignment with the drive unit. Axial and radial piloting surfaces are provided for both the stationary and rotary parts of the attachment.

In a specific embodiment, a coupling member is attached to the drive unit by means of springs, and ramp-shaped coupling teeth are provided on either the coupling member or the head so that, when matching teeth on the other part of the coupling are engaged and rotated, the ramp causes the coupling member to be drawn away from the drive unit. Thus, the spring force produces a bias of the coupling member and the head toward the drive unit, insuring a stable and precise alignment.

In the drawings:

FIG. 1 is a side elevation of a drive unit in accord with the present invention having a drill chuck attachment mounted thereon;

FIG. 2 is a side elevation of the forward end of the drive unit and of the coupling member in accord with this invention;

FIG. 3 is a side elevation of the drill chuck head ready for insertion into the coupling member of this invention;

FIG. 4 is an end view of the chuck attachment taken along the line 4—4 of FIG. 3;

FIG. 5 is an end view of the drive unit and coupling member taken along the line 5—5 in FIG. 3; and FIG. 6 is a cross sectional view taken along the lines 6—6 in FIG. 5.

FIG. 1 is an overall view of a power tool comprising a drive unit 10 and an attached drilling unit 11. The drive unit may include a motor housing 12, a handle 13, a trigger switch 14 for applying power from a cord set 15 to a motor located within the motor housing 12. A gear case 16 contains an appropriate set of speed reducing gears and the front end 17 of the housing includes a bearing block which supports the output shaft of the drive unit. The front end 17 also supports the coupling assembly to which the attachment 11 is assembled. The attachment 11 includes a separate coupling member 18 and, by way of example, a chuck 19 which is used to provide an output through drill bit 20.

FIG. 2 illustrates the drive unit portion of the coupling assembly. Specifically, the front end portion 17 of the drive unit housing supports an axial piloting surface 21 and a radial piloting surface 22. A cup 23 forms the female portion of the coupling assembly. The cup 23 includes a pair of severed, resilient fingers 24 which are provided with inwardly bent tabs, one of which is shown at 25. To assemble the cup to the front end of the drive unit, the spring fingers 24 are expanded and the cup is fitted over the front end until the tabs 25 enter slots 26 formed in the front end member 17. Thus, the cup 23 is secured to the housing 17 in a manner which prevents rotation thereof but, subject to the spring biasing force of the fingers 24, permits a small amount of axial movement between the cup and the drive unit. The cup 23 also includes a plurality of ramp-shaped teeth 27 within its leading edge. The tabs 25 may also serve to retain the bearing block within the housing 17.

FIG. 3 shows the drill attachment 11 juxtaposed with the drive unit and ready for assembly therewith. The attachment unit includes a chuck 19, which is representative of a wide variety of other attachment heads which may be substituted therefor, and a male coupling member 18. The end of the male coupling member 18 which is adjacent the drive unit includes a plurality of lugs 28 formed on a part of the attachment 29 which are spaced to interfit with the teeth 27 on the female coupling member 23. When the attachment 11 is inserted and rotated within the cup 23, the lugs 28 engage with and are pressed inwardly by the ramp shape of the teeth 27.

The attachment coupling assembly also includes a piloting member 30 which is provided with piloting surfaces 31 and 32, arranged to meet the piloting surfaces 21 and 22 on the front end 17 of the drive unit as the lugs 28 enter the spaces between the teeth 27. In this manner, the surfaces 21–31 and 22–32 insure proper axial alignment and concentricity of the attachment relative to the drive unit. The precision and stability of this alignment is insured by the function of the spring fingers 24. Specifically, as the attachment is rotated so that the lugs 28 engage ramp teeth 27, the camming action of the ramp teeth produces a force tending to pull the cup 23 and the attachment 11 together. Since the attachment is already engaged with and located by the piloting surfaces 21 and 22, the axial movement generated by the ramp is taken up in the spring fingers 24 and the cup 23 is moved forward toward the attachment. Since the spring fingers are engaged via tabs 25 with the drive unit housing, the resilience of the fingers 24 produces a clamping force tending to draw the drive unit housing and the attachment into tight engagement. Thus, in contrast to previous attachment assemblies which have utilized ramp teeth and other rotationally actuated coupling assemblies to produce a force which presses the attachment forwardly against a ramp tooth or some other outboard surface, the structure just described produces a force tending to draw the drive unit and the attachment into tighter engagement and specifically, draws a flat piloting surface 31 on the attachment into tight engagement with a flat piloting surface 21 on the drive unit. This enables the coupling of these members to be very precise and very stable; at the same time, the coupling assembly is very simple to operate since it requires only insertion and relative twisting of the two units.

FIGS. 4 and 5, respectively, are end views of the attachment and of the drive unit. In addition to the parts of the assembly previously described, FIG. 4 illustrates a socket for the drive shaft extending for the drive unit. The socket includes a first-encountered hexagonal portion 33 and a second, circular portion 34 which is substantially within the attachment. As shown in FIG. 5, the drive shaft extending from the drive unit includes an outboard, circular portion 35, also shown in FIGS. 2 and 3 and a hexagonal portion 36 which, in the views of FIGS. 2 and 3, is within the front end 17. When the attachment is assembled to the drive unit, the extended circular shaft 35 enters the circular aperture 34 and provides an extended radial piloting surface for the rotating parts while a positive drive coupling is provided by the engagement of the hexagonal shaft portion 36 within the hexagonal aperture 33. This coupling of the driving and driven members increases the precision and stability of the alignment of the functioning parts. Axial piloting is preferably provided by the abutment of the end surface 37 of the hexagonal socket against the bearing 38.

A particular benefit provided by this invention arises directly from this arrangement of piloting surfaces. Specifically, because of the positive engagement of the piloting surfaces of the attachment with the piloting surfaces of the drive unit, and the positive engagement force applied by the spring means, the need for a bearing surface in the attachment is eliminated. When the attachment is separated from the drive unit, the parts thereof may feel somewhat loose due to the existence of a small clearance between the rotary member, for example chuck 19, and the stationary parts such as cup 18, lug-member 29 and piloting member 30. When the attachment is assembled to the drive unit, the piloting arrangement provided by this invention is sufficient to accurately maintain these parts in a slightly spaced position so that no bearing surface is required. Thus, the cost of the unit to the consumer is reduced due to the elimination of the additional bearing in the attachment which has previously been required.

In order to secure the attachment in it fixed, operative position, a lock button 40 is also provided in a slot 41 in the front end 17 of the drive unit housing. As shown in FIG. 5, the lock button is trapped in its slot by shoulders 42 which engage the edges of an opening 43 in the attachment-securing cup. The button is biassed outwardly by a spring 44. When an attachment is inserted, a leading edge of the lug-carrying member 29 encounters a tapered edge 45 on button 40, thus moving it inwardly into a slot 46 in piloting surface 22. The attachment may then be rotated until a slot 47 in member 29 registers with the lock button at which point the button snaps outwardly into locking engagement with the edges of slot 47. To release the attachment, the operator merely depresses the button 40.

While a specific embodiment of this invention has been shown and described for purposes of illustration, it will be clear to those skilled in the art that many changes and modifications thereof actually fall within the purview of this invention. For example, the essence of the coupling assembly lies in the provision of a spring-retained coupling part at any point along the path of holding forces between the drive unit and the attachment. The specific arrangement of a cup and spring fingers forms a preferred embodiment of this invention since it is a particularly simple and easily manufactured assembly. However, other arrangements utilizing the concept of the ramp teeth producing a bias in a spring member which then functions to draw the attachment tightly to the drive unit would also fall within the spirit of the present invention. In addition, it is noted that provision may be made for providing multiple, axially-displaced piloting surfaces and corresponding multiple-level lug and teeth structures, as described in my co-pending application, Ser. No. 7,139, assigned to the assignee of this invention, without departing from the broad concept of the present invention. Accordingly, it is intended that the appended claims cover all such changes and modifications as may fall within the true spirit and scope of this invention.

I claim:

1. A power tool assembly including a power unit and a tool attachment arranged to be coupled thereto in driven relationship comprising complementary sets of bayonet teeth respectively mounted on said power unit and said attachment for insertion of one of said sets into the other of said sets and for relative rotation of said sets into an interlocking position to couple said unit and said attachment;

said power unit and said attachment each having matching piloting surfaces for aligning said attachment with said power unit upon insertion and rotation of said sets; and spring means coupling at least one of said sets to one of said power unit and said attachment for biassing said power unit and said attachment into tight engagement on said piloting surfaces upon insertion and rotation of said sets into said interlocking position whereby precise alignment of said power unit and said attachment is maintained.

2. A power tool assembly as claimed in claim 1 wherein said power unit includes a rotary drive means and said attachment includes a rotary driven means, said drive means and said driven means being coupled along an axis of rotation when said attachment is coupled to said power unit.

3. A power tool assembly as claimed in claim 2 wherein said piloting surfaces so position said attachment and said rotary means that said driven means is spaced from the stationary parts of said attachment and no bearing surface is required therein.

4. A power tool assembly as claimed in claim 2 wherein said matching piloting surfaces include a non-rotating surface on said power unit and a non-rotating surface on said attachment, each of said surfaces being in a plane perpendicular to said axis.

5. A power tool assembly as claimed in claim 4 wherein said spring means exerts a force in a direction parallel to said axis.

6. A power tool assembly as claimed in claim 5 wherein a coupling member is provided on one of said power unit and said attachment, said coupling member being engaged therewith by said spring means; and wherein one of said sets of teeth is mounted on said coupling member.

7. A power tool assembly as claimed in claim 6 wherein said teeth in at least one of said sets include a ramp surface of increasing height so that, upon insertion and rotation of said sets, said coupling member moves against said spring means toward said other of said power unit and said attachment whereby said spring means exerts a force drawing said piloting surfaces into tight engagement.

8. A power tool assembly as claimed in claim 7 wherein said coupling member is mounted on said power unit and wherein said ramp surface is provided on the teeth on said coupling member.

9. A power tool assembly as claimed in claim 4 wherein said piloting surfaces further include non-rotating radially-abutting surfaces on each of said power unit and said attachment.

10. A power tool assembly as claimed in claim 9 wherein said piloting surfaces further include axially-abutting rotary surfaces on said power unit and said attachment.

11. A power tool assembly as claimed in claim 10 wherein said piloting surfaces further include radially-abutting rotary surfaces on said power unit and said attachment.

12. A power tool assembly as claimed in claim 11 wherein said piloting surfaces so position said attachment and said rotary means that said driven means is spaced from the stationary parts of said attachment and no bearing surface is required therein.

13. A power tool assembly as claimed in claim 1 wherein said teeth in at least one of said sets are provided with a ramp surface, said surface producing a bias in said spring means upon said rotation of said teeth whereby said power unit and said attachment are drawn together by said bias.

14. A power tool assembly including a power unit and a tool attachment arranged to be coupled thereto in driven relationship comprising
complementary sets of bayonet teeth respectively mounted on said power unit and said attachment for insertion of one of said sets into the other of said sets and for relative rotation of said sets into an interlocking position to couple said unit and said attachment;
one of said sets including teeth having a ramp surface of increasing height in a direction to cause tight engagement of said unit and said attachment upon said rotation;
one of said sets being coupled to one of said power unit and said attachment by a spring means, said spring means being disposed to be displaced from its unstressed configuration by the movement produced by said ramp surface; and
a locking member biased into engagement with said power unit and said attachment in the assembled position thereof, for preventing relative rotation thereof during operation of said power tool.

15. A power tool assembly as claimed in claim 14 wherein said spring means is stretched by said movement.

16. A power tool assembly including a power unit and a tool attachment arranged to be coupled thereto in driven relationship comprising
complementary sets of bayonet teeth respectively mounted on said power unit and said attachment for insertion of one of said sets into the other of said sets and for relative rotation of said sets into an interlocking position to couple said unit and said attachment;
one of said sets including teeth having a ramp surface of increasing height in a direction to cause tight engagement of said unit and said attachment upon said rotation;
a locking member biased into engagement with said power unit and said attachment in the assembled position thereof, for preventing relative rotation thereof during operation of said power tool.

17. A power tool assembly including a power unit and a tool attachment arranged to be coupled thereto in driven relationship comprising
a coupling member rotationally fixed to and axially movable on one of said power unit and said tool attachment;
spring means axially biasing said coupling member toward said one of said power unit and said tool attachment;
complementary sets of bayonet teeth respectively mounted on said coupling member and the other of said power unit and said tool attachment for insertion of one of said sets into the other of said sets and for relative rotation of said sets into an interlocking position to couple said unit and said attachment;
one of said sets including teeth having a ramp surface of increasing height in a direction to cause tight engagement of said unit and said attachment upon said rotation.

* * * * *